United States Patent
Allison

(10) Patent No.: US 12,492,767 B2
(45) Date of Patent: Dec. 9, 2025

(54) METHOD OF USING A HOSE COUPLING DEVICE

(71) Applicant: David Allison, Clifton, TX (US)

(72) Inventor: David Allison, Clifton, TX (US)

( * ) Notice: Subject to any disclaimer, the term of this patent is extended or adjusted under 35 U.S.C. 154(b) by 0 days.

(21) Appl. No.: 18/541,170

(22) Filed: Dec. 15, 2023

(65) Prior Publication Data

US 2024/0337338 A1    Oct. 10, 2024

Related U.S. Application Data

(63) Continuation-in-part of application No. 18/456,558, filed on Aug. 28, 2023.
(60) Provisional application No. 63/494,567, filed on Apr. 6, 2023.

(51) Int. Cl.
*F16L 27/08* (2006.01)
*B23P 11/00* (2006.01)

(52) U.S. Cl.
CPC .......... *F16L 27/0804* (2013.01); *B23P 11/00* (2013.01); *F16L 27/0861* (2013.01)

(58) Field of Classification Search
CPC ... F16L 27/0804; F16L 15/08; F16L 27/0812; F16L 27/0816; F16L 27/082; F16L 33/24; F16L 35/005; F16L 27/0861
See application file for complete search history.

(56) References Cited

U.S. PATENT DOCUMENTS

| | | | | |
|---|---|---|---|---|
| 3,752,507 | A * | 8/1973 | Maurer | E21B 21/02 285/275 |
| 5,014,732 | A * | 5/1991 | Nitzberg | B67D 7/3218 137/614.04 |
| 5,074,598 | A * | 12/1991 | Masseth | F16L 25/0036 285/39 |
| 5,671,954 | A * | 9/1997 | Cheramie | F16L 27/0816 285/272 |
| 11,415,252 | B2 * | 8/2022 | Vallo | F16L 27/082 |

\* cited by examiner

*Primary Examiner* — Sarang Afzali
(74) *Attorney, Agent, or Firm* — Brennan, Manna & Diamond, LLC

(57) ABSTRACT

A method of using a hose coupling device is disclosed. The device is an improved hose coupling that allows the hose to move more freely than a traditional coupling. The hose coupling device comprises a sleeve component with a female hose thread on one end and a male hose thread on the other end. The sleeve component further comprises a bearing above and below an O-ring water seal. The hose coupling component rotates independently from the hand nozzle component and eliminates the twist/kink of the hose when walking around spraying water.

3 Claims, 4 Drawing Sheets

METHOD OF USING A HOSE COUPLING DEVICE

CROSS-REFERENCE TO RELATED APPLICATION

The present application is a continuation in part application of, and claims priority to and the benefit of, U.S. patent application Ser. No. 18/456,558, which was filed on Aug. 28, 2023 and claims priority from U.S. Provisional Application No. 63/494,567, which was filed on Apr. 6, 2023, both of which are incorporated herein by reference in their entirety.

FIELD OF THE INVENTION

The present invention relates generally to the field of hose coupling devices. More specifically, the present invention relates to a hose coupling with an integrated O-ring seal that permits the coupling to rotate and eliminates the worry of kinks occurring. Accordingly, the present disclosure makes specific reference thereto. Nonetheless, it is to be appreciated that aspects of the present invention are also equally applicable to other like applications, devices, and methods of manufacture.

BACKGROUND

By way of background, this invention relates to improvements in hose coupling devices. Generally, walking around with a garden hose and spraying water in a specific direction can be difficult. Further, the handheld nozzle can become unthreaded from the hose end and spray water on the user. Additionally, trying to adjust the angle of the nozzle may be nearly impossible without fully moving the position of the hose.

Furthermore, when walking around with a garden hose and spraying water, the hose can develop twists and/or kinks. Kinks and/or twists in a garden hose, make spraying water in a specific direction difficult and inefficient.

Accordingly, there is a demand for an improved hose device that rotates in conjunction with the hose nozzle and eliminates twists and/or kinks in the hose. More particularly, there is a demand for a hose device that allows the hose to move more freely to help reduce torque while keeping the nozzle secured firmly to the hose.

Therefore, there exists a long-felt need in the art for a hose coupling device that provides users with a hose coupling with an integrated O-ring seal that permits the coupling to rotate and eliminates the worry of kinks occurring. There is also a long-felt need in the art for a hose coupling device that allows users to walk around with their garden hose and spray water freely without worry of kinks or leaks. Further, there is a long-felt need in the art for a hose coupling device that utilizes a rotating metal sleeve that rotates independently from the spray nozzle. Moreover, there is a long-felt need in the art for a device that prevents the spray nozzle from becoming detached and spraying water all over the user. Further, there is a long-felt need in the art for a hose coupling device that has a female hose thread on one end with a male hose thread on the other end. Finally, there is a long-felt need in the art for a hose coupling device that reduces torque while keeping the nozzle secured firmly to the hose.

The subject matter disclosed and claimed herein, in one embodiment thereof, comprises a hose coupling device. The device is an improved hose coupling that allows the hose to move more freely than a traditional coupling when moving around and unraveling. The hose coupling device comprises a sleeve component with a female hose thread on one end and a male hose thread on the other end. The sleeve component further comprises a bearing above and below an O-ring water seal. The hose coupling component rotates in conjunction with the hand nozzle component and eliminates the twist/kink of the hose when walking around spraying water. Further, the hose coupling device helps reduce torque while keeping the hand nozzle component secured firmly to the hose.

In this manner, the hose coupling device of the present invention accomplishes all of the forgoing objectives and provides users with a device that allows users to walk around with their garden hose and spray water freely without the worry of kinks. The device is a sleeve component that rotates independently from the hand spray nozzle component. The device can be manufactured of a metal material.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a hose coupling device. The device is an improved hose coupling that allows the hose to move more freely than a traditional coupling. The hose coupling device comprises a sleeve component with a female hose thread on one end and a male hose thread on the other end. The sleeve component further comprises a bearing surface above and below an O-ring water seal, to allow the sleeve component to rotate independently. Thus, the hose coupling component rotates in conjunction with the hand nozzle component and eliminates the twists and/or kinks of the hose when walking around spraying water. Further, the hose coupling device helps reduce torque while keeping the hand nozzle component secured firmly to the hose.

In one embodiment, the hose coupling device is adapted for connection to a conventional garden hose. The hose coupling device comprises a sleeve component. The sleeve component is a tubular, cannulated body having a bore extending there through. Typically, the sleeve component is cylindrical in shape, but can be any suitable shape as is known in the art. Further, the sleeve component can be any suitable size and shape as is known in the art but is typically sized and shaped to resemble a conventional garden hose to which it is adapted.

In one embodiment, the sleeve component comprises a first end and an opposing second end. The first end comprises a female hose thread with internal threads that secure to the outwardly facing threads of a conventional garden hose. Specifically, the sleeve component is secured via being threaded onto an end of a conventional garden hose. In one embodiment, a set screw or locking screw is then inserted to further secure the sleeve component to the conventional garden hose, such that the hose coupling device won't unscrew itself from the garden hose.

In one embodiment, the second end of the sleeve component comprises a male hose thread with external threads that secure the internal threads of a conventional hand nozzle component. The hand nozzle component can be any suitable spray nozzle as is known in the art that typically secures to a conventional garden hose. Further, the sleeve component is secured via being threaded into the hand nozzle component.

In one embodiment, the sleeve component comprises an internal bearing surface that is positioned above and below an O-ring water seal. Specifically, the O-ring water seal is sandwiched between the two bearing surfaces. This prevents leaks within the device and allows the sleeve component to rotate independently of the hand nozzle component. Thus, preventing twists and kinks within the conventional garden hose, while a user is walking and spraying water through the nozzle.

In one embodiment, the hose coupling device is manufactured of a metal material, such as stainless steel, aluminum, galvanized aluminum, copper, etc., or any other suitable materials as is known in the art. In one embodiment, the hose coupling device is manufactured of a polymer material, a thermoplastic, such as polycarbonate, polyethylene, PVC, etc., or any other suitable materials as is known in the art.

In yet another embodiment, the hose coupling device comprises a plurality of indicia.

In yet another embodiment, a method of allowing a hose to move more freely when walking around and spraying water from a nozzle is disclosed. The method includes the steps of providing a hose coupling device comprising a sleeve component with a female hose thread on one end and a male hose thread on the other end, and an O-ring water seal. The method also comprises securing the hose coupling device to a hose end via the female hose thread end. Further, the method comprises securing a hand nozzle component to the male hose thread end of the device. Finally, the method comprises utilizing the hose to spray water through the hand nozzle component while allowing the hose coupling device to rotate independently to the hand nozzle component.

Numerous benefits and advantages of this invention will become apparent to those skilled in the art to which it pertains, upon reading and understanding the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
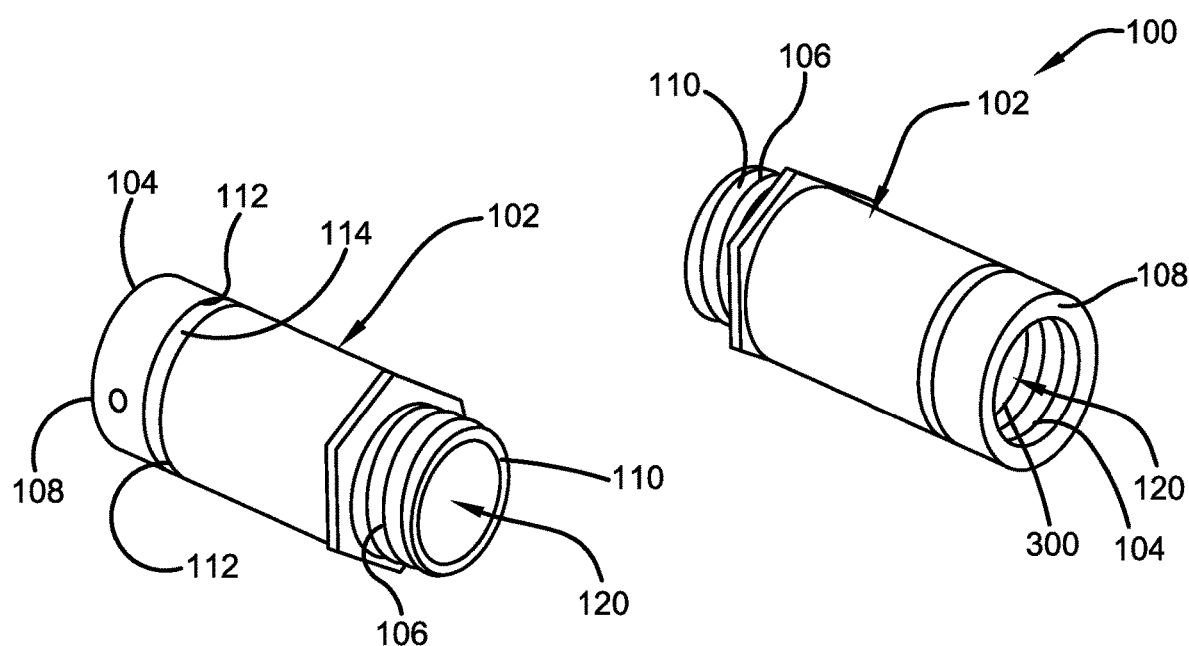
FIG. 1 illustrates a perspective view of one embodiment of the hose coupling device of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for a hose coupling device that provides users with a hose coupling with an integrated O-ring seal that permits the coupling to rotate and eliminates the worry of kinks occurring. There is also a long-felt need in the art for a hose coupling device that allows users to walk around with their garden hose and spray water freely without worry of kinks or leaks. Further, there is a long-felt need in the art for a hose coupling device that utilizes a rotating metal sleeve that rotates independently from the spray nozzle. Moreover, there is a long-felt need in the art for a device that prevents the spray nozzle from becoming detached and spraying water all over the user. Further, there is a long-felt need in the art for a hose coupling device that has a female hose thread on one end with a male hose thread on the other end. Finally, there is a long-felt need in the art for a hose coupling device that reduces torque while keeping the nozzle secured firmly to the hose.

The present invention, in one exemplary embodiment, is a novel hose coupling device. The device is an improved hose coupling that allows the hose to move more freely than a traditional coupling. The hose coupling device comprises a sleeve component with a female hose thread on one end and a male hose thread on the other end. The sleeve component further comprises a bearing surface above and below an O-ring water seal (i.e., an O-ring water seal sandwiched between two bearing surfaces). The hose coupling component rotates in conjunction with the hand nozzle component and eliminates the twist/kink of the hose when walking around spraying water. The present invention also includes a novel method of allowing a hose to move more freely when walking around and spraying water from a nozzle. The method includes the steps of providing a hose coupling device comprising a sleeve component with a female hose thread on one end and a male hose thread on the other end, and an O-ring water seal. The method also comprises securing the hose coupling device to a hose end via the female hose thread end. Further, the method comprises securing a hand nozzle component to the male hose thread end of the device. Finally, the method comprises utilizing the hose to spray water through the hand nozzle component while allowing the hose coupling device to rotate independently to the hand nozzle component.

Referring initially to the drawings, FIG. 1 illustrates a perspective view of one embodiment of the hose coupling device 100 of the present invention. In the present embodiment, the hose coupling device 100 is an improved hose coupling device 100 that allows a conventional garden hose 118 to move more freely than a traditional coupling. Specifically, the hose coupling device 100 comprises a sleeve component 102 with a female hose thread 104 on one end 108 and a male hose thread 106 on the other end 110. Further, the sleeve component 102 comprises a bearing surface 112 above and below an O-ring water seal 114, to allow the sleeve component 102 to rotate independently. Thus, the hose coupling device 100 rotates in conjunction with the hand nozzle component 116 and eliminates the twists and/or kinks of a conventional garden hose 118 when walking around spraying water. Further, the hose coupling device 100 helps reduce torque while keeping the hand nozzle component 116 secured firmly to the hose 118.

Figure 2:
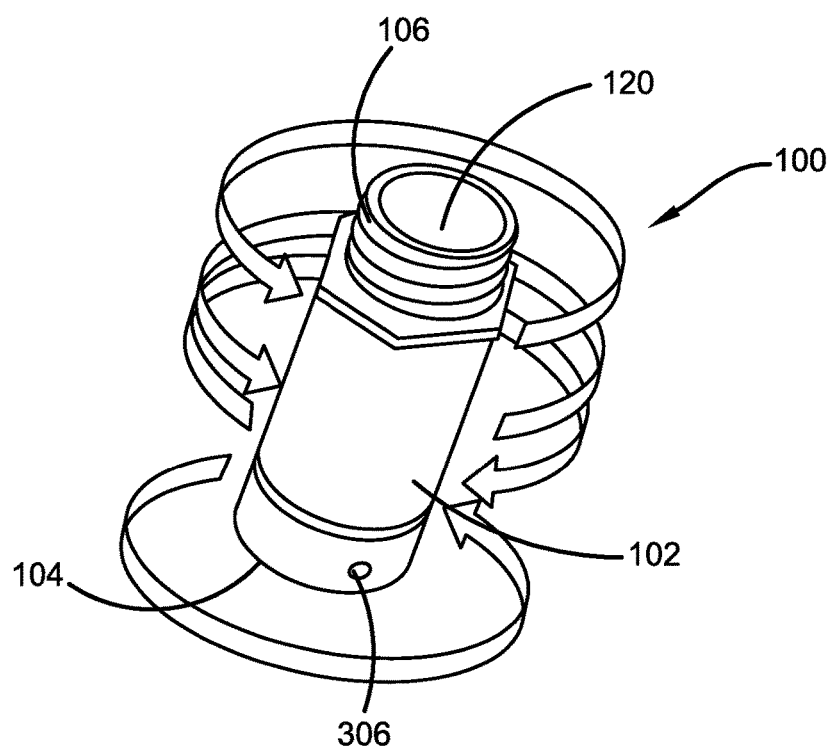
FIG. 2 illustrates a perspective view of one embodiment of the hose coupling device of the present invention showing how the device rotates in accordance with the disclosed architecture.

As shown in FIG. 2, the hose coupling device 100 is adapted for connection to a conventional garden hose 118, or any other suitable hose as is known in the art. The hose coupling device 100 comprises a sleeve component 102. The sleeve component 102 is a tubular, cannulated body having a bore 120 extending there through. Typically, the sleeve component 102 is cylindrical in shape, but can be any suitable shape as is known in the art. Further, the sleeve component 102 can be any suitable size and shape as is known in the art but is typically sized and shaped to resemble a conventional garden hose 118 to which it is adapted.

Furthermore, the sleeve component 102 comprises an internal bearing surface 112 that is positioned above and below an O-ring water seal 114. Specifically, the O-ring water seal 114 is sandwiched between the two bearing surfaces 112. This prevents leaks within the device 100 and allows the sleeve component 102 to rotate independently to a hand nozzle component 116. Thus, preventing twists and kinks within the conventional garden hose 118, while a user is walking and spraying water through the nozzle 116. Specifically, the sleeve component 102 would rotate independently and opposite to the attached nozzle 116, allowing a user to walk freely with the hose 118, without worry of kinks and/or twists. This also prevents the nozzle 116 from becoming detached and spraying water all over the user.

Figure 3:
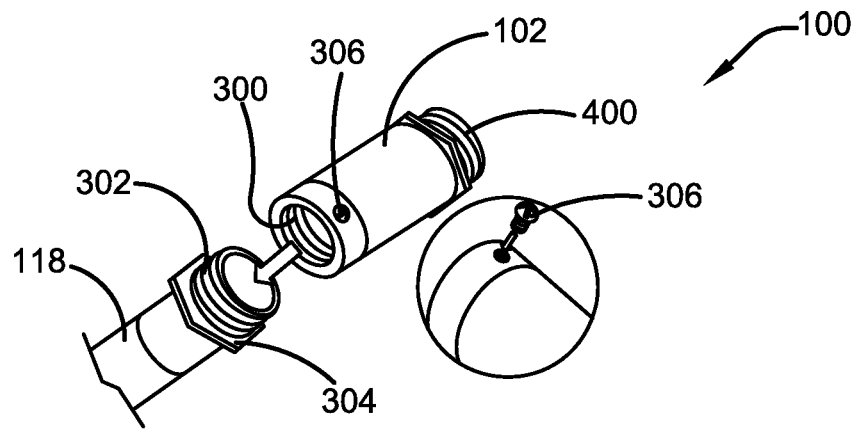
FIG. 3 illustrates a perspective view of one embodiment of the hose coupling device of the present invention showing how the device secures to a hose in accordance with the disclosed architecture.

As shown in FIG. 3, the sleeve component 102 comprises a first-end 108 and an opposing second-end 110. The first end 108 comprises a female hose thread 104 with internal threads 300 that secure to the outwardly facing threads (i.e., external threads 302) of a conventional garden hose 118. Specifically, the sleeve component 102 is secured via being threaded onto an end 304 of a conventional garden hose 118. Further, a set screw or locking screw 306 is then inserted to further secure the sleeve component 102 to the conventional garden hose 118, such that the hose coupling device 100 won't unscrew itself from the garden hose 118. Any suitable locking screw can be utilized as is known in the art.

Figure 4:
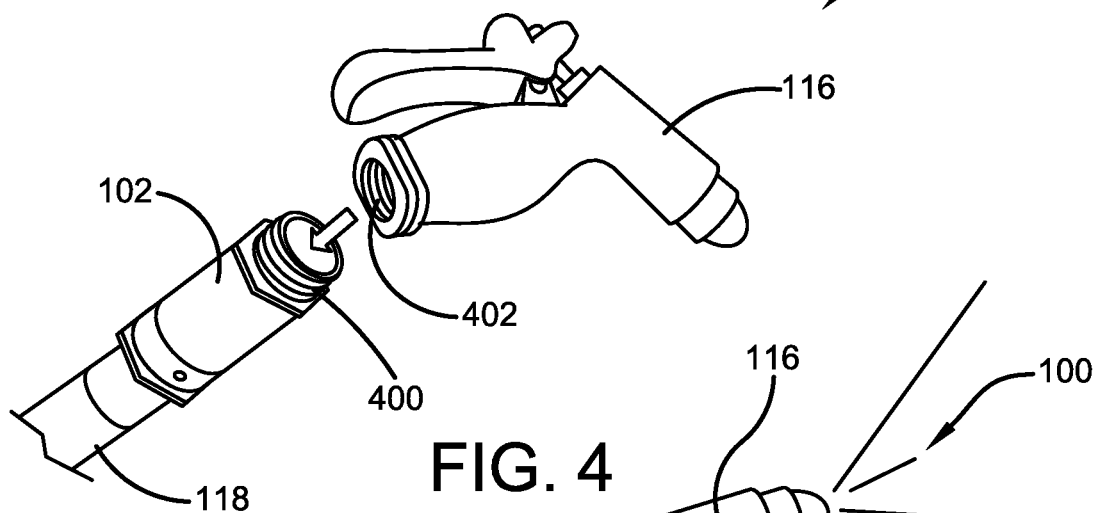
FIG. 4 illustrates a perspective view of one embodiment of the hose coupling device of the present invention showing how a hand nozzle component is secured to the device in accordance with the disclosed architecture.

As shown in FIG. 4, the second end 110 of the sleeve component 102 comprises a male hose thread 106 with external threads 400 that secure to the internal threads 402 of a conventional hand nozzle component 116. The hand nozzle component 116 can be any suitable spray nozzle as is known in the art that typically secures to a conventional garden hose 118. Further, the sleeve component 102 is secured via being threaded into the hand nozzle component 116.

Figure 5:
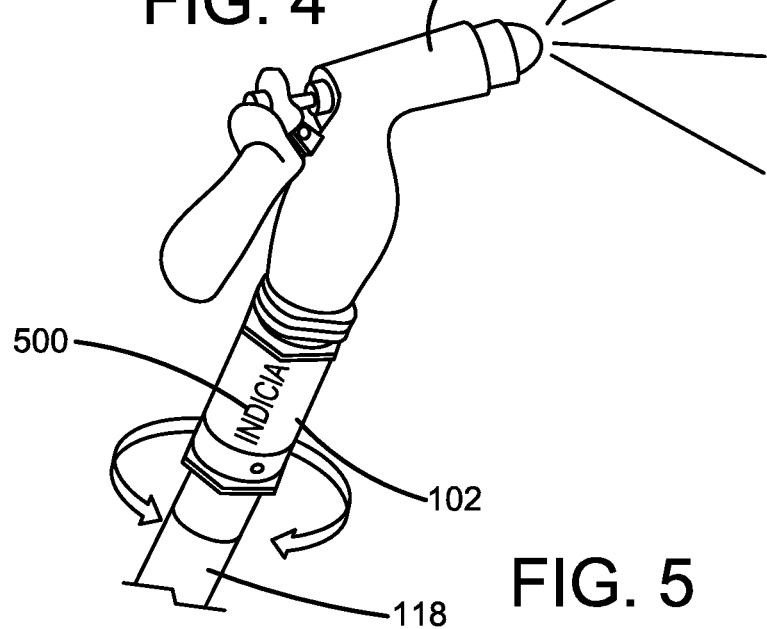
FIG. 5 illustrates a perspective view of one embodiment of the hose coupling device of the present invention in use in accordance with the disclosed architecture.

As shown in FIG. 5, the hose coupling device 100 is manufactured of a metal material, such as stainless steel, aluminum, galvanized aluminum, copper, etc., or any other suitable materials as is known in the art. In one embodiment, the hose coupling device 100 is manufactured of a polymer material, a thermoplastic, such as polycarbonate, polyethylene, PVC, etc., or any other suitable materials as is known in the art.

In yet another embodiment, the hose coupling device 100 comprises a plurality of indicia 500. The sleeve component 102 of the device 100 may include advertising, a trademark, or other letters, designs, or characters, printed, painted, stamped, or integrated into the sleeve component 102, or any other indicia 500 as is known in the art. Specifically, any suitable indicia 500 as is known in the art can be included, such as, but not limited to, patterns, logos, emblems, images, symbols, designs, letters, words, characters, animals, advertisements, brands, etc., that may or may not be hose, nozzle, or brand related.

Figure 6:
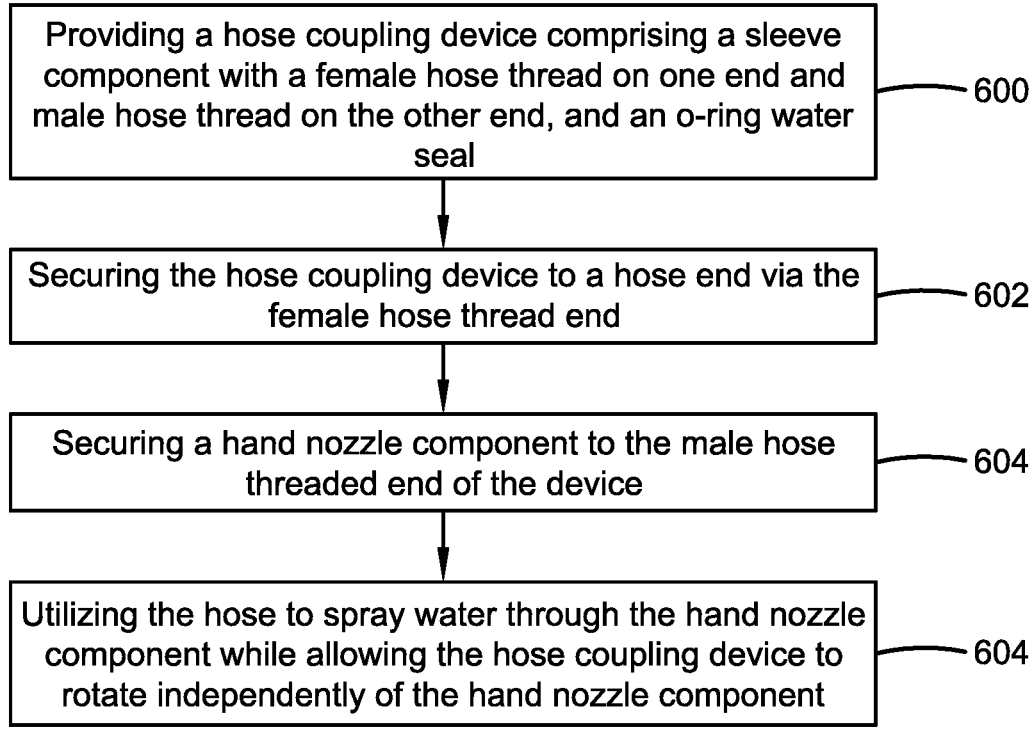
FIG. 6 illustrates a flowchart showing the method of allowing a hose to move more freely when walking around and spraying water from a nozzle in accordance with the disclosed architecture.

FIG. 6 illustrates a flowchart of the method of allowing a hose to move more freely when walking around and spraying water from a nozzle. The method includes the steps of at 600, providing a hose coupling device comprising a sleeve component with a female hose thread on one end and a male hose thread on the other end, and an O-ring water seal. The method also comprises at 602, securing the hose coupling device to a hose end via the female hose thread end. Further, the method comprises at 604, securing a hand nozzle component to the male hose thread end of the device. Finally, the method comprises at 606, utilizing the hose to spray water through the hand nozzle component while allowing the hose coupling device to rotate independently to such as the hand nozzle component.

Figure 7:
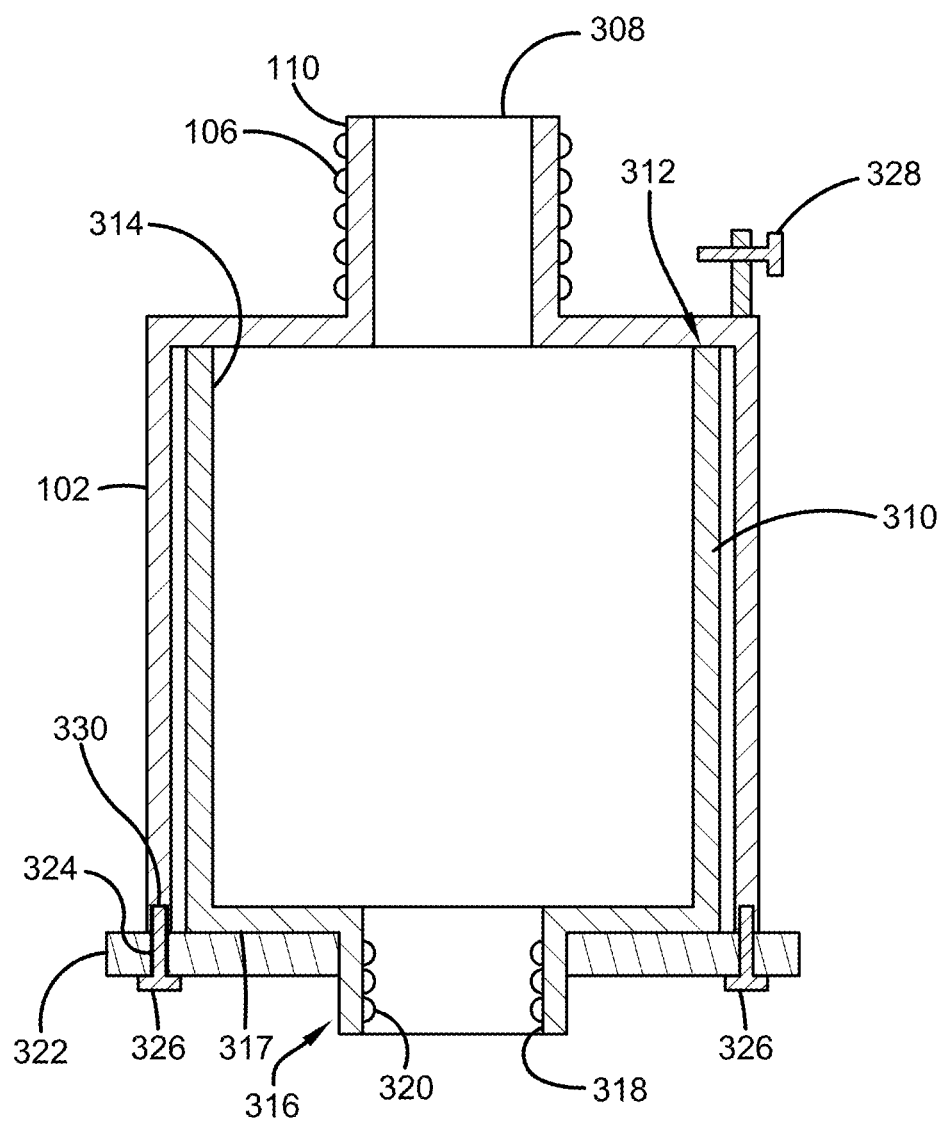
FIG. 7 illustrates a cross-sectional side view of one embodiment of the hose coupling device of the present invention in accordance with the disclosed architecture.

In one embodiment, the device 100 is comprised of a 3-piece construction, as seen in FIG. 7. In this embodiment, an outer sleeve 102 is comprised of an opening 308 at the second end 110, wherein the interior of the opening 308 is comprised of a plurality of male threads 106 that allow the second end 110 to attach in a threaded manner to the internal female threads 402 of a spray/hand/hose nozzle 116. In this embodiment, the device 100 is comprised of an inner sleeve 310 in fluid communication with the outer sleeve 102. The inner sleeve 310 is comprised of a first end 312 and a second end 316, each with at least one opening 314 and 318 respectively. The opening 318 of the second end 316 of the inner sleeve 310 is comprised of a plurality of female threads 320 that allow the sleeve 310 to attach to the external threads 302 of a hose 118. In this manner, the inner sleeve 310 attaches to the hose 118.

To secure the inner sleeve 310 within the outer sleeve 102, the device 100 is also comprised of at least one ring 322. The ring 322 contacts the bottom edge 317 of the inner sleeve 310 and is comprised of at least one opening 324. The opening 324 allows at least one fastener 326 to be placed through the ring 322 and into an opening 330 in the outer sleeve 102 wall. Both or either opening 324, 330 may be threaded in different embodiments, wherein the fastener 326 is also a threaded fastener such as but not limited to a bolt. In one embodiment, the fastener 326 may also pass through the inner sleeve 310.

To further secure the device 100 to a hose nozzle 116 and/or hose 118, the outer sleeve 102 and/or inner sleeve 310 may also be comprised of at least one set screw 328 that can be turned such that it contacts the hose nozzle 116 and/or hose 118 and further secures the inner and outer sleeves 102 and 310 to the hose nozzle 116 and/or hose 118.

The device 100 is also comprised of a second method 700 of using the device 100. First, a device 100 is provided comprised of an outer sleeve 102, and inner sleeve 310, and a ring 322 [Step 702]. Then, the inner sleeve 310 can be positioned within the outer sleeve 102 [Step 704]. Next, the ring can be placed against the bottom edge 317 of the inner sleeve 310 and at least one fastener 326 (which is preferably a threaded fastener) can be inserted through the ring 322 and into the outer sleeve 102 wall [Step 706]. Next, the first end 108 can be threadedly attached to a hose thread 106 [Step 708]. Then, the second end 110 can be threadedly attached to a hose nozzle 116 [Step 710]. Then, at least one set screw 328 of the outer sleeve 102 can be turned such that it contacts the hose 118 and further secures the device 100 to the hose 118 [Step 712]. Finally, the method comprises utilizing the hose to spray water through the hand nozzle component while allowing the outer sleeve 102 attached to the ring 322 and the hose nozzle 116 to rotate independently from the inner sleeve 310 attached to the hose [Step 713].

Certain terms are used throughout the following description and claims to refer to particular features or components. As one skilled in the art will appreciate, different users, may refer to the same feature or component by different names. This document does not intend to distinguish between components or features that differ in name but not structure or function. As used herein "hose coupling device", "hose device", "coupling device", and "device" are interchangeable and refer to the hose coupling device 100 of the present invention.

Notwithstanding the foregoing, the hose coupling device 100 of the present invention can be of any suitable size and configuration as is known in the art without affecting the overall concept of the invention, provided that it accomplishes the above stated objectives. One of ordinary skill in the art will appreciate the hose coupling device 100 as shown in FIGS. 1-7 is for illustrative purposes only, and many other sizes and shapes of the hose coupling device 100 are well within the scope of the present disclosure. Although the dimensions of the hose coupling device 100 are important design parameters for user convenience, the hose coupling device 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of using a hose coupling device, the method comprising:
   providing a hose coupling device comprised of an outer sleeve, an inner sleeve, and a ring;
   positioning the inner sleeve within the outer sleeve;
   wherein the outer sleeve comprises a first end and a second end comprising a plurality of male threads, wherein the inner sleeve comprises a first end adjacent to the second end of the outer sleeve and a second end comprising a plurality of female threads; and wherein outer sleeve is in fluid communication with the inner sleeve;
   placing the ring against a bottom edge of the inner sleeve adjacent to the second end of the inner sleeve and placing a fastener through a fastener opening of the ring and into a wall opening of the outer sleeve to secure the ring to the outer sleeve;
   attaching, in a threaded manner, the second end of the outer sleeve to a hose nozzle;
   attaching, in a threaded manner, the second end of the inner sleeve to a hose; and
   turning a set screw to contact and further secure the coupling device to the hose nozzle;
   wherein the set screw is positioned on the outer sleeve, and
   wherein the outer sleeve attached to the ring and the hose nozzle rotates independently from the inner sleeve attached to the hose.

2. The method of using a hose coupling device of claim 1, wherein the fastener is comprised of a threaded fastener.

3. The method of using a hose coupling device of claim 2, wherein the threaded fastener is comprised of a bolt.

* * * * *